United States Patent
Hardy et al.

(10) Patent No.: US 11,445,088 B2
(45) Date of Patent: Sep. 13, 2022

(54) HIGH-SPEED SINGLE-PASS PRINTING USING COMBINED DITHER PATTERN

(71) Applicant: Memjet Technology Limited

(72) Inventors: Rodney Hardy, North Ryde (AU); James Lawrence, North Ryde (AU)

(73) Assignee: Memjet Technology Limited

( * ) Notice: Subject to any disclaimer, the term of this patent is extended or adjusted under 35 U.S.C. 154(b) by 0 days.

(21) Appl. No.: 17/206,753

(22) Filed: Mar. 19, 2021

(65) Prior Publication Data

US 2021/0295121 A1 Sep. 23, 2021

Related U.S. Application Data

(60) Provisional application No. 62/992,672, filed on Mar. 20, 2020.

(51) Int. Cl.
| | |
|---|---|
| H04N 1/40 | (2006.01) |
| H04N 1/405 | (2006.01) |
| G06K 15/02 | (2006.01) |
| G06K 15/10 | (2006.01) |
| B41J 2/21 | (2006.01) |
| H04N 1/52 | (2006.01) |
| B41M 5/50 | (2006.01) |

(52) U.S. Cl.
CPC ............ *H04N 1/405* (2013.01); *B41J 2/2132* (2013.01); *G06K 15/027* (2013.01); *G06K 15/102* (2013.01); *G06K 15/1876* (2013.01); *G06K 15/1881* (2013.01); *H04N 1/52* (2013.01); *B41M 5/50* (2013.01)

(58) Field of Classification Search
CPC combination set(s) only.
See application file for complete search history.

(56) References Cited

U.S. PATENT DOCUMENTS

| | | | |
|---|---|---|---|
| 8,777,343 B2* | 7/2014 | Ishikawa | G06K 15/107 347/9 |
| 2012/0212532 A1* | 8/2012 | Seccombe | G06K 15/107 347/10 |
| 2013/0188225 A1* | 7/2013 | Kuiper | G06K 15/1881 358/3.06 |

OTHER PUBLICATIONS

D. L. Lau, R. Ulichney and G. R. Arce, "Blue and green noise halftoning models," in IEEE Signal Processing Magazine, vol. 20, No. 4, pp. 28-38, Jul. 2003, doi: 10.1109/MSP.2003.1215229 (Year: 2003).*

* cited by examiner

*Primary Examiner* — Barbara D Reinier
(74) *Attorney, Agent, or Firm* — Cooley LLP (57) ABSTRACT

A method of processing a contone image for single-pass printing uses a printing system having first and second aligned printheads supplied with a same ink. The method includes the steps of: providing the contone image at a first resolution in a printing direction; dithering the contone image using a combined dither pattern to provide a full halftone image at the first resolution; dividing the full halftone image into first and second halftone images at a second resolution in the printing direction, the second resolution being less than the first resolution; and sending the first and second halftone images to respective first and second printheads for printing. The combined dither pattern is a combination of a first dither pattern for the first printhead and a second dither pattern for the second printhead, the first dither pattern being different than the second dither pattern.

7 Claims, 5 Drawing Sheets

HIGH-SPEED SINGLE-PASS PRINTING USING COMBINED DITHER PATTERN

CROSS REFERENCE TO RELATED APPLICATIONS

This application claims priority to and the benefit of U.S. Provisional Patent Application No. 62/992,672, entitled METHOD OF DITHERING FOR HIGH-SPEED SINGLE-PASS PRINTING, filed on Mar. 20, 2020, the disclosure of which is incorporated herein by reference in its entirety for all purposes.

FIELD OF THE INVENTION

The present invention relates to a method of dithering for high-speed single-pass printing. It has been developed primarily for optimizing print quality when printing using multiple monochrome printheads aligned along a media feed direction.

BACKGROUND

Single-pass ("pagewide") printing dramatically increases print speeds compared to traditional scanning printheads. One application of single-pass printing is in digital inkjet presses, as described in, for example, U.S. Pat. Nos. 10,457,075; 10,081,204 and 9,421,790, the contents of which are incorporated herein by reference.

In a typical color inkjet press, multiple monochrome printheads are aligned with each other along a media feed direction with each printhead printing a different color (e.g. CMYK). In principle, print speeds may be increased by increasing the number of printheads used to print each color. For example, a monochrome black printing system may double its printing speed by doubling the number of printheads printing black ink—a first printhead may print half of the dots required by a halftone image and a second downstream printhead may print the other half of the dots. It will be appreciated that print speeds may be tripled, quadrupled etc. by further increasing the number of aligned printheads.

As is well known in the art, halftone images (or bitmaps) containing discrete dots at a specified printing resolution are generated from contone images using a dithering process. For printing at double speed using two printheads, simplistically, the halftone image needs to be divided ("deinterleaved") into two portions, one for each printhead. For example, alternate lines of the halftone image may be printed by each of the two printheads—the first printhead printing odd lines of the image and the downstream second printhead printing even lines of the image or vice versa. Thus, each printhead receives a halftone image at half the resolution (in the printing direction) of the full halftone image. If, for example, the full halftone image is generated at a resolution of 1600×790 dpi, then each printhead would receive a respective halftone image at a resolution of 1600×395 dpi. The two halftone images are interleaved by the two printheads during printing to recreate the full halftone image at the target resolution of 1600×790 dpi.

Printing at increased speeds using multiple high-resolution printheads in the manner described above requires excellent alignment of the printheads. Without excellent alignment of the printheads, print quality generally declines to an extent that is unacceptable to users.

Misalignment of printheads may arise from a number of sources. Firstly, mechanical placement of the printheads must be accurately controlled to within a few microns in order to avoid misalignment between a pair of printheads. The Applicant has previously described sophisticated alignment patterns (see US Publication No. 2020/0223221, the contents of which are incorporated herein by reference), which may be used to determine misalignments and allow fine correction thereof using suitable mechanical means. However, even with perfectly mechanically positioned printheads, relative misalignments are still possible due to the small differences in the conformation of individual printheads, arising from their manufacturing process. For example, in relatively long pagewide printheads, the printheads have a tendency to bow along their long axis, some more than others depending on the precise manufacturing conditions. If a relatively 'bowed' printhead is paired with a relatively 'non-bowed' printhead, then those two printheads will typically have poor alignment even with perfect mechanical positioning of the two printheads. Whilst studies by the Applicant show that only a relatively small percentage (about 10%) of randomized printhead pairings are unmatched, ideally, it should be ensured that 'non-bowed' printheads are matched with similarly 'non-bowed' printheads and 'bowed' printheads are matched with similarly 'bowed' printheads in order to maximize alignment. However, printhead matching in this way is problematic in a supply chain. Users expect printheads to be replaceable with any printhead of the same type; moreover, measuring an extent of bowing and then categorizing printheads based on such measurements adds complexity and expense to the supply chain. Even with such a categorization of printheads at the factory, the extent of bowing may change due to other factors in the field. For example, a printhead nest which mechanically holds the printhead when installed in a printing system may affect the extent of bowing. Hence, characterization of printhead bowing at the factory may not be a good indicator of printhead bowing in the field.

It would therefore be desirable to provide a method of high-speed printing using upstream and downstream printheads, which optimizes print quality irrespective of the relative alignment of those printheads. In particular, it would be desirable to optimize print quality for printheads that are not perfectly aligned, either due to imperfect mechanical placement of the printheads or mismatching of printhead pairings.

SUMMARY OF INVENTION

In a first aspect, there is provided a method of single-pass printing using a printing system comprising at least first and second aligned printheads supplied with a same ink, the second printhead being downstream of the first printhead, the method comprising the steps of:

receiving first and second halftone images at the first and second printheads, respectively; printing the first halftone image from the first printhead; and printing the second halftone image from the second printhead such that a resulting printed image contains the second halftone image interleaved with the first halftone image, wherein:

the printed image is printed at a first resolution in a printing direction;

the first and second halftone images have a second resolution in the printing direction, the second resolution being less than the first resolution;

the first halftone image is based on a first dither pattern and the second halftone image is based on a second dither pattern, the first dither pattern being different than the second dither pattern.

Preferably, the method comprises the steps of providing a full contone image for one ink channel of the printing system at the first resolution in a printing direction.

Preferably, the method comprises the steps of:
dividing the full contone image at the first resolution into at least first and second contone images at the second resolution in the printing direction, the second resolution being less than the first resolution;
dithering the first contone image using the first dither pattern to provide the first halftone image at the second resolution; dithering the second contone image using the second dither pattern to provide the second halftone image at the second resolution.

Preferably, the first and second contone images contain respective first and second sets of lines of the full contone image.

Preferably, the first and second contone images contain respective alternate lines of the full contone image.

Preferably, the first and second contone images have a same resolution as the full contone image in a direction perpendicular to the printing direction.

Preferably, the method comprises the steps of:
dithering the full contone image using a combined dither pattern to provide a full halftone image at the first resolution;
dividing the full halftone image into at least first and second halftone images at the second resolution in the printing direction, the second resolution being less than the first resolution;
wherein the combined dither pattern is a combination of a first dither pattern for the first printhead and a second dither pattern for the second printhead, the first dither pattern being different than the second dither pattern.

Preferably, the first and second halftone images contain respective first and second sets of lines of the full halftone image.

Preferably, the first and second halftone images contain respective alternate lines of the full halftone image.

Preferably, the step of providing the contone image for one ink channel comprises one or more of:
rasterizing;
calibrating to a target printing resolution; and
generating, from a color contone image, a plurality of contone images corresponding to respective ink channels of the printing system.

Preferably, the printing system comprises n aligned printheads supplied with the same ink and the second resolution is 1/n of the first resolution in the printing direction.

Preferably, the printing system comprises two aligned printheads supplied with the same ink and the second resolution is half of the first resolution.

Preferably, the first and second dither patterns are independently selected from the group consisting of: blue noise dither patterns and green noise dither patterns.

In a related aspect, there is provided a print medium having an image printed thereon, the image comprising a first halftone image interleaved with a second halftone image, the first and second halftone images being printed with a same ink, wherein the first halftone image is based on a first dither pattern and the second halftone image is based on a second dither pattern, the first dither pattern being different than the second dither pattern.

In a second aspect, there is provided a method of processing a contone image for single-pass printing using a printing system comprising at least first and second aligned printheads supplied with a same ink, the second printhead being downstream of the first printhead, the method comprising the steps of:
providing the contone image for one ink channel at a first resolution in a printing direction;
dithering the contone image using a combined dither pattern to provide a full halftone image at the first resolution;
dividing the full halftone image into at least first and second halftone images at a second resolution in the printing direction, the second resolution being less than the first resolution; and
sending the first and second halftone images to respective first and second printheads for printing;
wherein the combined dither pattern is a combination of a first dither pattern for the first printhead and a second dither pattern for the second printhead, the first dither pattern being different than the second dither pattern.

Preferably, the first and second halftone images contain respective first and second sets of lines of the full halftone image.

Preferably, the first and second halftone images contain respective alternate lines of the full halftone image.

Preferably, the first and second halftone images have a same resolution as the full halftone image in a direction perpendicular to the printing direction.

Preferably, the printing system comprises n aligned printheads supplied with the same ink and the second resolution is 1/n of the first resolution in the printing direction.

Preferably, the printing system comprises two aligned printheads supplied with the same ink and the second resolution is half of the first resolution.

Preferably, the step of providing the contone image for one ink channel comprises one or more of:
rasterizing;
calibrating to a target printing resolution; and
generating, from a color contone image, a plurality of contone images corresponding to respective ink channels of the printing system.

Preferably, the method further comprises the step of:
printing the first halftone image from the first printhead; and
printing the second halftone image from the second printhead such that a resulting printed image contains the second halftone image interleaved with the first halftone image,
wherein the first and second halftone images are printed at the second resolution in the printing direction.

Preferably, the first and second dither patterns are independently selected from the group consisting of: blue noise dither patterns and green noise dither patterns.

In a related aspect, there is provided a processor configured to perform the steps of:
receiving or generating a contone image for one ink channel of a printing system at a first resolution in a printing direction;
dithering the contone image using a combined dither pattern to provide a full halftone image at the first resolution;
dividing the full halftone image into at least first and second halftone images at a second resolution, the second resolution being less than the first resolution;
sending the first and second halftone images to respective first and second printheads for printing;
wherein the combined dither pattern is a combination of a first dither pattern for the first printhead and a second dither pattern for the second printhead, the first dither pattern being different than the second dither pattern.

In another related aspect, there is provided a printing system comprising:
the processor as described above; and at least first and second aligned printheads,
wherein the second printhead is downstream of the first printhead.

In another related aspect, there is provided a method of processing a contone image for single-pass printing using a printing system comprising at least first and second aligned printheads supplied with a same ink, the second printhead being downstream of the first printhead, the method comprising the steps of:

providing the contone image for one ink channel at a first resolution in a printing direction;

selecting a dither pattern from the group consisting of: (a) a combined dither pattern comprising a combination of a first dither pattern for the first printhead and a second dither pattern for the second printhead, the first dither pattern being different than the second dither pattern; and (b) a third dither pattern for the first and second printheads;

dithering the contone image using the selected dither pattern to provide a full halftone image at the first resolution;

dividing the full halftone image into at least first and second halftone images at a second resolution in the printing direction, the second resolution being less than the first resolution; and sending the first and second halftone images to respective first and second printheads for printing, wherein selection of the dither pattern is based on relative printhead alignment between the first and second printheads.

Preferably, the combined dither pattern is selected for relatively poorly aligned first and second printheads and the third dither pattern is selected for relatively well aligned printheads.

Preferably, the relative printhead alignment is based on qualitative print quality feedback from a user.

Preferably, the relative printhead alignment is based on a quantitative alignment measurement.

Preferably, the dither pattern is selected automatically, the selection being based on the quantitative alignment measurement relative to a predetermined threshold.

Preferably, the third dither pattern is the same or different than the first dither pattern or the second dither pattern.

Preferred embodiments of the invention described above in relation to one aspect are, of course, equally applicable to other aspects of the invention where relevant.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids and the like. Where reference is made to fluids or printing fluids, this is not intended to limit the meaning of "ink" herein.

As used herein, the term "aligned printheads" is taken to mean a plurality of printheads that are generally aligned along a media feed direction, such that any one of the printheads is capable of printing onto a same part of the media as any other printhead. However, as will be readily apparent to the person skilled in the art, the term "aligned printheads" should not necessarily be taken to mean perfect alignment, positioning and/or matching of printheads as foreshadowed above. In one aspect, the present invention addresses the problem of small misalignments (e.g. less than 500 micron, less than 200 micron, less than 100 micron or less than 50 micron misalignments) between generally aligned printheads.

BRIEF DESCRIPTION OF THE DRAWINGS

One or more embodiments of the present invention will now be described with reference to the drawings, in which.

DETAILED DESCRIPTION

Figure 1:
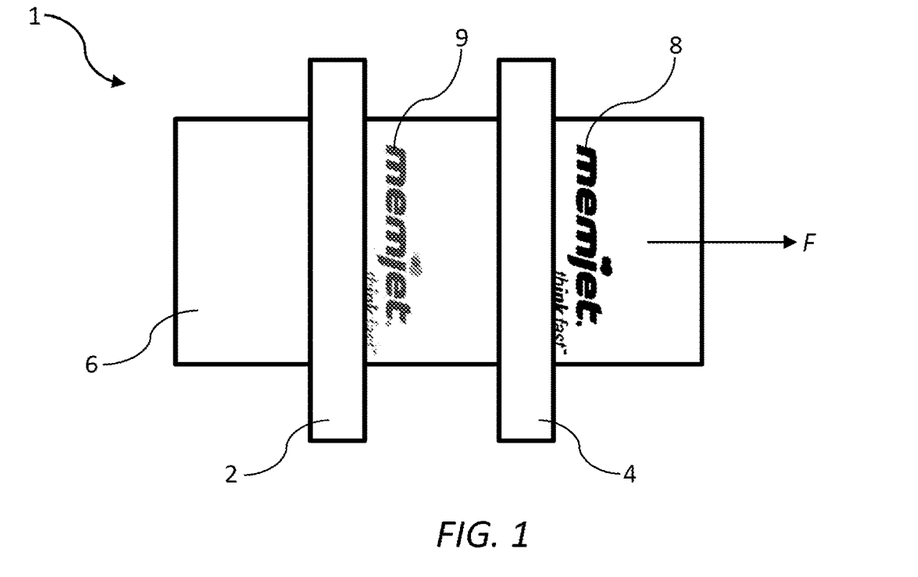
FIG. 1 is a schematic plan view of a printing system comprising first and second aligned printheads.

Referring to FIG. 1, there is shown schematically a printing system 1 comprising a first printhead 2 and a second printhead 4 positioned downstream of the first printhead relative to a media feed direction indicated by arrow F. The second printhead is aligned with the first printhead in the media feed direction insofar as both printheads are capable of printing onto a same portion of media 6 (e.g. cut-sheet media or a roll-to-roll fed media web). An extent of alignment between the first and second printheads 2 and 4 may vary according to individual printhead conformations, printhead placement accuracy etc, as described above.

Each of the first and second printheads 2 and 4 is a monochrome printhead supplied with a same ink so as to enable double-speed printing. For double-speed printing, each printhead prints half an image at half the target resolution (in the media direction F). For example, a full halftone image may be generated at a target resolution of 1600×790 dpi and each of the first and second printheads 2 and 4 is configured to print at a resolution of 1600×395 dpi. Typically, each printhead prints respective alternate lines (row) of the full halftone image. Since printheads have a maximum drop ejection frequency, it will be appreciated that halving the resolution in the media feed direction F enables printing at twice the speed that would otherwise be obtainable.

Each of the first and second printheads 2 and 4, is typically a component of a print module, which may additionally comprise a printhead mounting structure, electronics for supply of data and power to the printhead, ink couplings, pressure regulator(s) etc. Examples of suitable print modules are described in U.S. Pat. Nos. 10,457,075 and 10,081,204, the contents of which are incorporated herein by reference.

Figure 2:
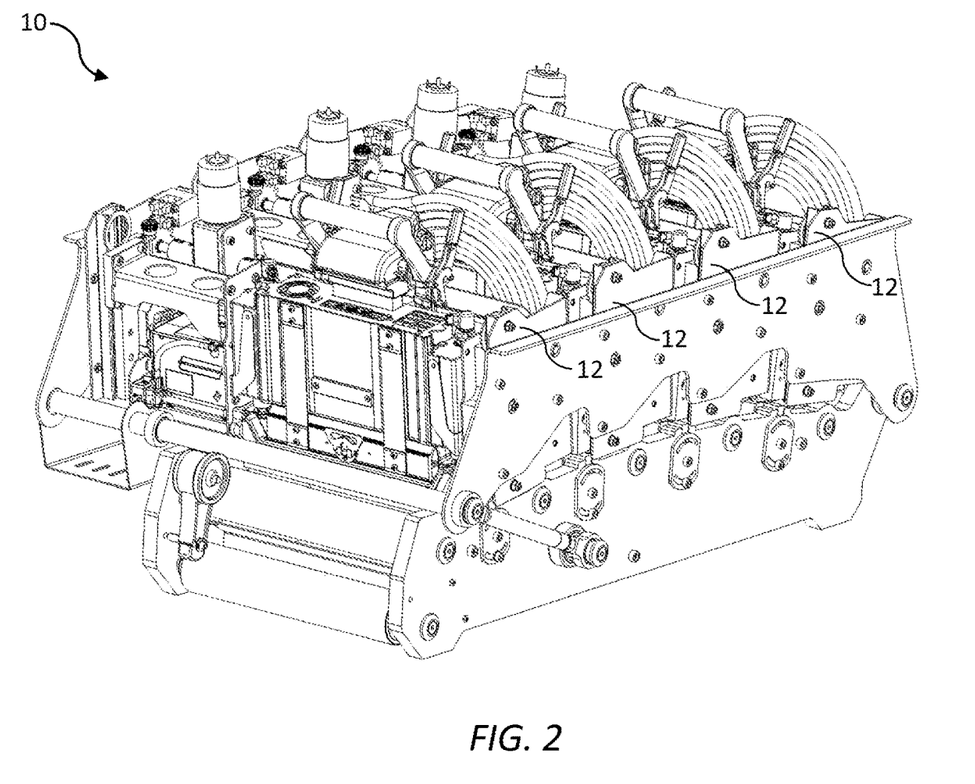
FIG. 2 is a perspective of a print engine comprising four print modules.

By way of example, and referring to FIG. 2, there is shown a print engine 10 having four aligned print modules 12 as described in US 2019/0118537, the contents of which are incorporated herein by reference. Each print module 12 comprises a respective printhead (not visible in FIG. 2) as well as ink couplings, PCBs etc. It will be appreciated that the print engine 10 having four aligned printheads supplied with a same ink potentially enables quadruple-speed printing by allocating a quarter of a full halftone image to each of the four print modules 12. For example, every $4^{th}$ line of the full halftone image may be allocated to a respective print module 12, such that each printhead prints at one ¼ resolution in the media feed direction. A full halftone image generated at a resolution of 1600×800 dpi would be printed at a resolution of 1600×200 dpi by each printhead, thereby enabling the print engine 10 to print at quadruple speed compared to a single print module 12.

In principle, any number of n printheads may be used to print at n times speed by allocated 1/n of a full halftone image (e.g. every nth line of the halftone image) to a respective one of the n printheads.

Figure 3:
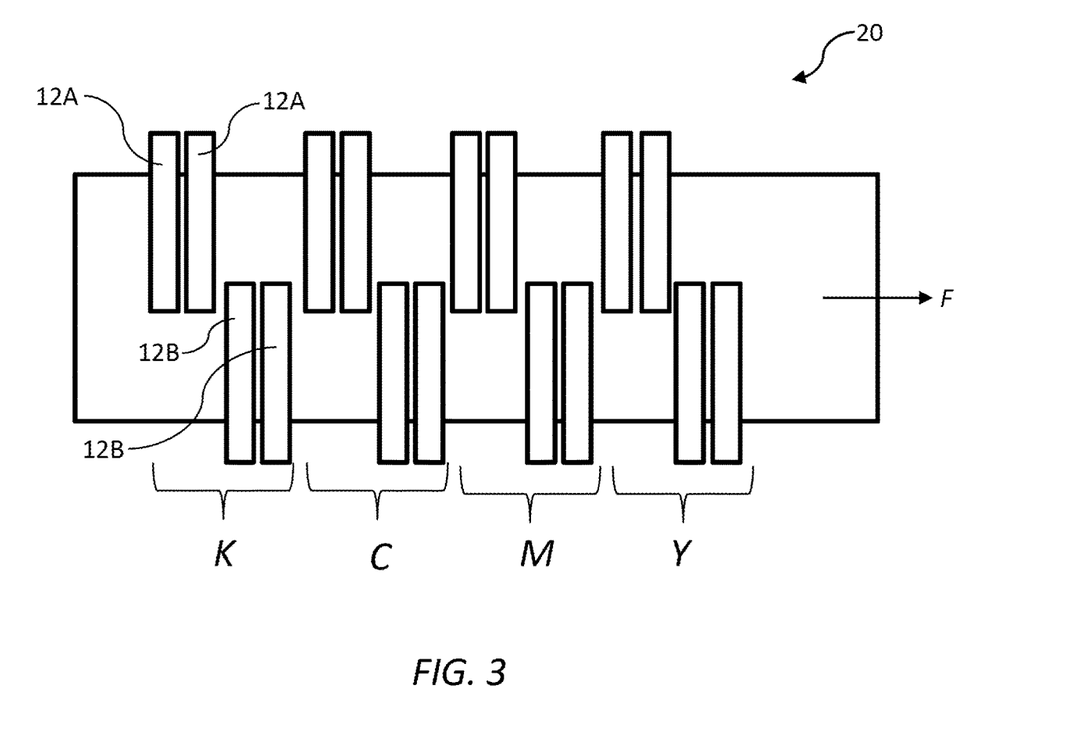
FIG. 3 is a schematic plan view of a printing system comprising an 8×2 array of printheads.

Of course, the aligned printheads may be part of a matrix of printheads arranged for color and/or wide format printing. FIG. 3 shows schematically a print engine 20 containing sixteen print modules 12 in an 8×2 array for full color printing. The print modules 12 are arranged in sets of four for printing each of four colors (KCMY). In each of the color channels (KCMY), there are two pairs of aligned print modules 12, each pair of aligned print modules overlapping to print onto a different portion of the media. For example, as shown in the black channel, the pair of print modules 12A are aligned and the pair of print modules 12B are aligned along the media feed direction F. Thus, each ink (color) channel is capable of printing at double speed in the manner described above in connection with FIG. 1.

Figure 4:
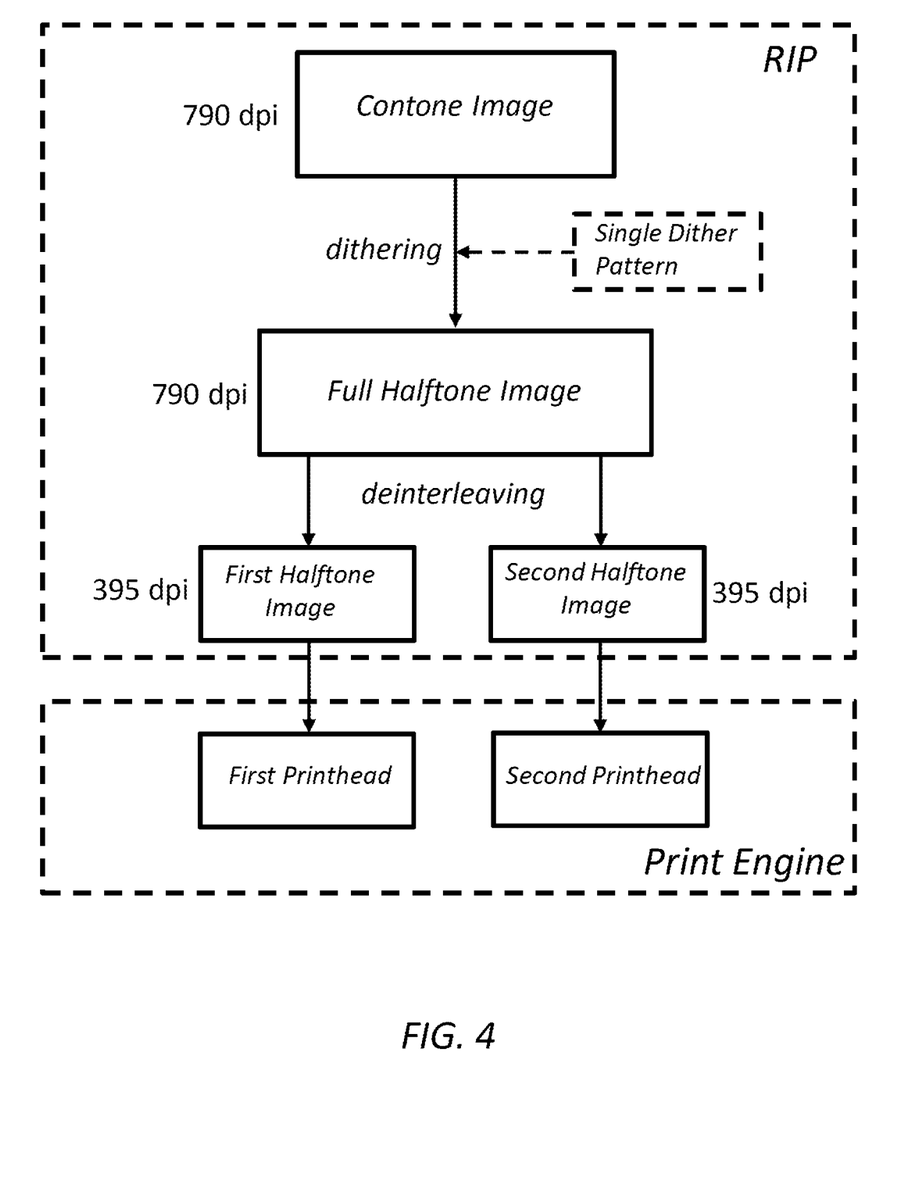
FIG. 4 shows conventional processing steps for generating first and second halftone images for printing using the printing system shown in FIG. 1.

Referring to FIG. 4, there is shown a simple method of processing a contone image at a first resolution for high-speed printing using the first printhead 2 and the second printhead 4 shown in FIG. 1. The method is performed in a raster image processor (RIP) although, for the sake of clarity, not all processing steps performed by the RIP are shown in FIG. 4. The contone image is a contone (grayscale) bitmap for a single ink channel at the target printing resolution of 1600×790 dpi. The skilled person will understand that typical upstream processing steps in the RIP (e.g. rasterizing, color space conversion, ink channel separation, calibration to the target printing resolution etc) are not shown in FIG. 4.

Still referring to FIG. 4, in a first step, the contone image is dithered using a conventional single dither pattern (e.g. a blue noise dither as described in U.S. Pat. No. 5,111,310 or a green noise dither as described in U.S. Pat. No. 6,493,112 etc.) to generate a full halftone image. The full halftone image is then divided into a first halftone image and a second halftone image, each at a second resolution, in a process known as "deinterleaving". Alternate rows of the full halftone image are allocated to respective printheads, such that each of the first and second halftone images resulting from the deinterleaving process has a resolution of 1600×395 dpi. For example, the first halftone image may comprise odd lines (1, 3, 5, 7 etc.) of the full halftone image and the second halftone image may comprises even lines (0, 2, 4, 8 etc.) of the full halftone image or vice versa. The first and second halftone images are then sent to respective first and second printheads of a print engine and for printing.

In the single-pass printing process using a first printhead 2 and a downstream second printhead 4, as shown in FIG. 1, the full printed image 8 contains the first and second halftone images interleaved on the media 6 to represent the full halftone image generated from the dithering process. The half-density image 9 printed by the upstream first printhead 2 is based on the first halftone image only and is therefore printed at half density (alternate lines of the full halftone image).

With perfect alignment of the first printhead 2 and second printhead 4, the process described in connection with FIG. 4 provides excellent print quality and enables double-speed printing compared to a single printhead printing the full halftone image. However, small misalignments between the first printhead 2 and the second printheads 4 (e.g. resulting from small mechanical misplacements and/or mismatching of printhead conformations) results in a significant decline in print quality. In particular, print quality defects are exacerbated by interference effects between the first and second halftone images, which are not otherwise present when printing one color of ink from one printhead. Increasing misalignments between the first printhead 2 and the second printhead 4 result in a rapid decline in print quality, which is generally unacceptable to users.

Figure 5:
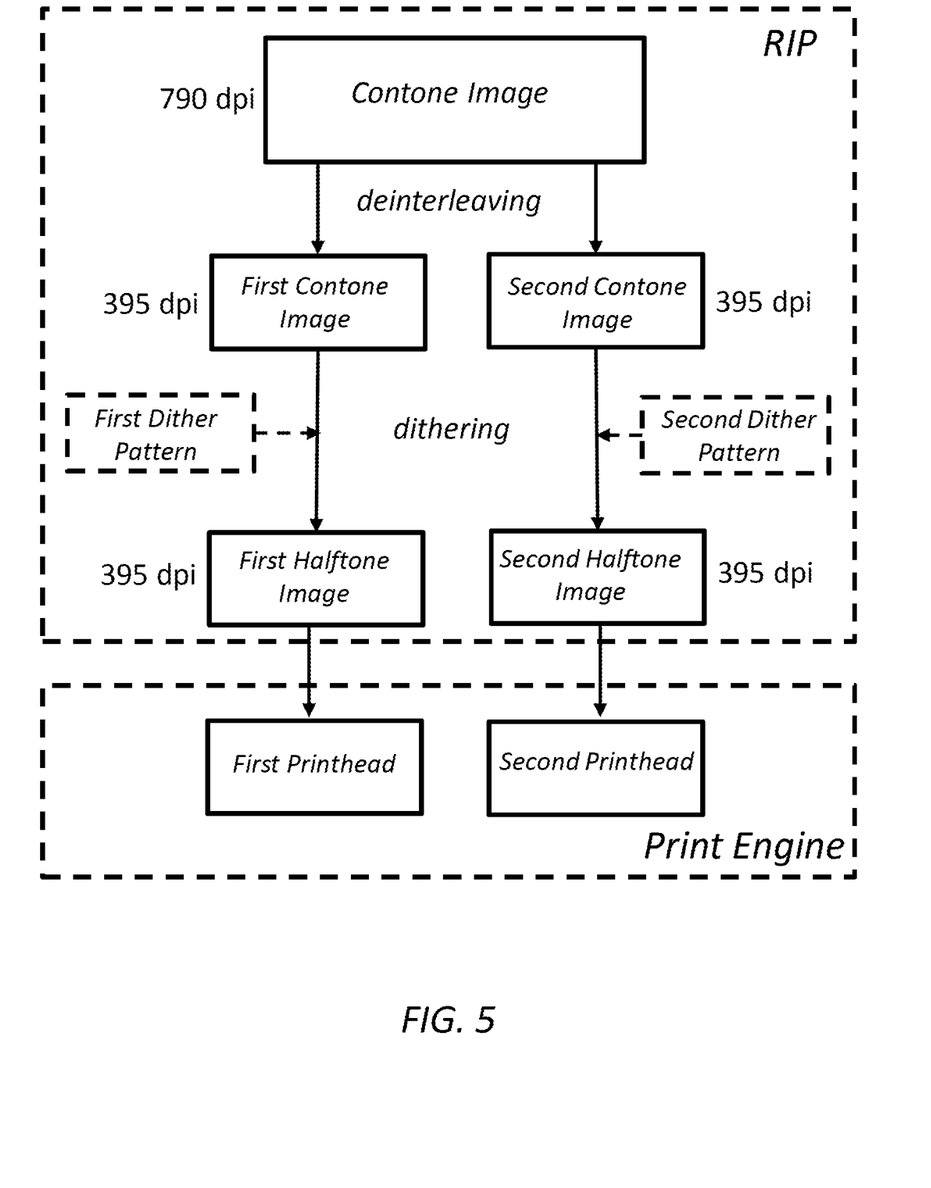
FIG. 5 shows processing steps for generating first and second halftone images according to a first embodiment.

Referring to FIG. 5, there is shown a method of processing a contone image according to a first embodiment of the invention. In the method shown in FIG. 5, the contone image is deinterleaved prior to dithering. Deinterleaving of the contone image is performed similarly to the deinterleaving process described above, whereby alternate lines of the full contone image are allocated to a first contone image and a second contone image. The first contone image is then dithered using a first dither pattern to generate the first halftone image and the second contone image is dithered using a second dither pattern to generate the second halftone image. Crucially, the first and second dither patterns are different.

When the first and second halftone images are printed using respective printheads, the printed image 8 generally has acceptable print quality. Advantageously, print quality is relatively tolerant of misalignments between the first printhead printhead 2 and the second printhead 4 compared to the method described above in connection with FIG. 4. In particular, it is understood by the present inventors that using different dither patterns for the first and second halftone images results in a somewhat less rapid decline in print quality with increasing misalignments between the printheads when compared to the method described above using a single dither pattern. Nevertheless, with good alignment between the first printhead 2 and the second printhead 4, the method according to the first embodiment produces lower print quality than the method described above.

It would be desirable for users to substitute between the two different processes described above in order to optimize print quality for different extents of alignment between printheads. For example, an initially perfect alignment between the first and second printheads 2 and 4 may change over time, or replacement of one or both printheads may result in misalignments. In this scenario, it would be desirable to change from the process shown in FIG. 4 to the process shown in FIG. 5. However, since the two processes involve different datapaths, it is impractical to reconfigure the RIP so as to substitute between these two processes.

Figure 6:
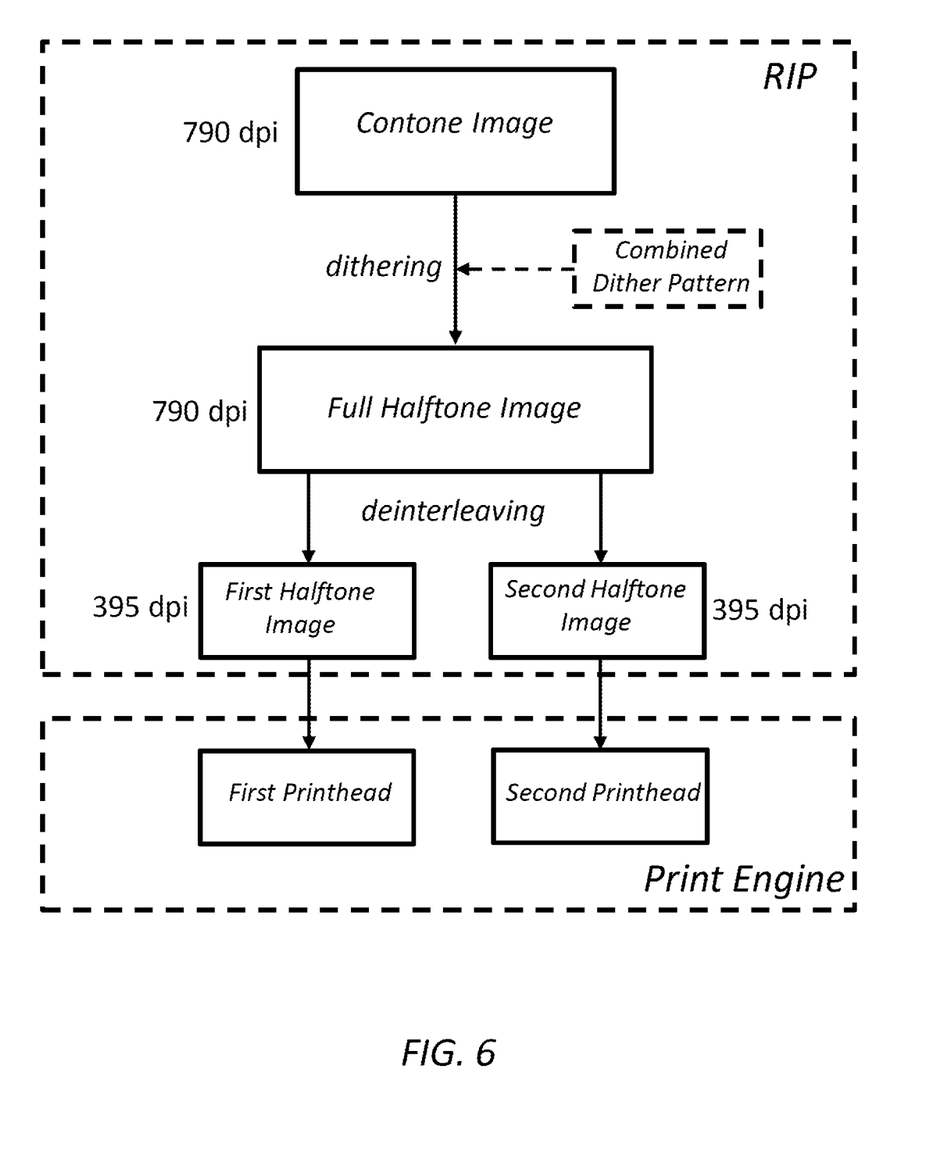
FIG. 6 shows processing steps for generating first and second halftone images according to a second embodiment.

Referring now to FIG. 6, there is shown a method of processing a contone image according to a second embodiment. The method shown in FIG. 6 has the same datapath as the method shown in FIG. 4—that is, the ordering of processing steps is identical in each case. However, the dithering step in the method shown in FIG. 6 employs a combined dither pattern comprising the first dither pattern and the second dither pattern. In other words, alternate lines of the combined dither pattern (or dither mask) are based on different dither patterns. For example, odd lines of the combined dither pattern may be based on the first dither pattern and even lines of the combined dither pattern may be based on the second dither pattern, which is different than the first dither pattern.

Accordingly, dithering using the combined dither pattern results in first and second halftone images, which are identical to the first and second halftone images described above in connection with FIG. 5. The method according to the second embodiment, therefore, enjoys the same advantages as the method according to the first embodiment.

Moreover, an additional advantage of the method according to the second embodiment is that the datapath uses the same sequence of processing steps as those shown in FIG. 4. Therefore, by simply substituting a conventional single dither pattern applied to the full contone image with the combined dither pattern, the RIP can readily switch between these two methods in order to optimize print quality for a given scenario.

For example, a user may provide empirical qualitative feedback on print quality and the dither may be switched accordingly. Alternatively, a printhead alignment test pattern may provide quantitative printhead alignment data, which can be used to select the most appropriate dither pattern.

The dither pattern may be selected automatically based on a printhead alignment measurement relative to a predetermined threshold. For example, if the printheads are determined to be aligned to within one dot pitch or less (in the printing direction) at the resolution of the first and second halftone images (i.e. within 64 microns for a 1600×395 dpi halftone image), then a single dither pattern may be employed, as shown in FIG. 4. However, if the printheads are aligned only to greater than one dot pitch (in the printing direction) at the resolution of the first and second halftone images (i.e. greater than 64 microns for a 1600×395 dpi halftone image), then the combined dither pattern may be employed, as shown in FIG. 6. The predetermined threshold may be variable depending on printing parameters (e.g. print speed, print media type, ink type etc.). In this way, print quality can be optimized for both well-aligned and somewhat misaligned printheads.

The foregoing describes only some embodiments of the present invention, and modifications of detail may be made thereto without departing from the scope of the invention, the embodiments being illustrative and not restrictive.

The invention claimed is:

1. A method of processing a contone image for single-pass printing using a printing system comprising at least first and second aligned printheads supplied with a same ink, the second printhead being downstream of the first printhead, the method comprising the steps of:
   providing the contone image for one ink channel at a first resolution in a printing direction;
   selecting a dither pattern from the group either one of: (a) a combined dither pattern comprising a combination of a first dither pattern for the first printhead and a second dither pattern for the second printhead, the first dither pattern being different than the second dither pattern; or (b) a third dither pattern for both the first and second printheads;
   dithering the contone image using the selected dither pattern to provide a full halftone image at the first resolution;
   dividing the full halftone image into at least first and second halftone images at a second resolution in the printing direction, the second resolution being less than the first resolution; and
   sending the first and second halftone images to respective first and second printheads for printing,
   wherein the selection of the dither pattern from either (a) the combined dither pattern, or (b) the third dither pattern is based on relative printhead alignment between the first and second printheads.

2. The method of claim 1, wherein the relative printhead alignment is based on qualitative print quality feedback from a user.

3. The method of claim 1, wherein the relative printhead alignment is based on a quantitative alignment measurement.

4. The method of claim 1, wherein the third dither pattern is the same or different than the first dither pattern or the second dither pattern.

5. The method of claim 1, wherein the first and second halftone images contain respective first and second sets of lines of the full halftone image.

6. The method of claim 1, wherein the printing system comprises n aligned printheads supplied with the same ink and the second resolution is 1/n of the first resolution in the printing direction.

7. The method of claim 1, wherein the printing system comprises two aligned printheads supplied with the same ink and the second resolution is half of the first resolution.

* * * * *